United States Patent [19]
Otto

[11] Patent Number: 5,365,218
[45] Date of Patent: Nov. 15, 1994

[54] SYSTEM FOR GUARDING PROPERTY INCLUDING A MOBILE LASER UNIT

[75] Inventor: Ulrich Otto, Nussdorf im Chiemgau, Germany

[73] Assignee: Deutsche Aerospace AG, Munich, Germany

[21] Appl. No.: 944,323

[22] Filed: Sep. 14, 1992

[30] Foreign Application Priority Data

Sep. 14, 1991 [DE] Germany ............................ 4130619

[51] Int. Cl.⁵ .......................................... G08B 13/183
[52] U.S. Cl. .................................... 340/557; 340/522; 340/556
[58] Field of Search .................... 340/557, 556, 522

[56] References Cited

U.S. PATENT DOCUMENTS

| | | | |
|---|---|---|---|
| 3,573,817 | 4/1971 | Akers | 340/522 |
| 4,660,024 | 4/1987 | McMaster | 340/522 |
| 4,952,911 | 8/1990 | D'Ambrosia et al. | 340/557 |

*Primary Examiner*—Glen Swann
*Attorney, Agent, or Firm*—Evenson, McKeown, Edwards & Lenahan

[57] ABSTRACT

Buildings, vehicles, and persons are protected by means of a laser monitoring device consisting of a laser transmitter and receiver and an associated evaluation unit. A platform with a variably adjustable rotational speed is located in an elevated unobstructed location above the property to be protected, on which platform the area-monitoring laser device is mounted. Also a position and turn gyroscope is connected with the platform to accommodate mobile operations.

16 Claims, 2 Drawing Sheets

SYSTEM FOR GUARDING PROPERTY INCLUDING A MOBILE LASER UNIT

BACKGROUND AND SUMMARY OF THE INVENTION

The invention relates to a system for guarding buildings and persons of the type utilizing a laser monitoring device including a laser transmitter and receiver and an associated evaluation unit.

Systems for guarding property are already known in a great variety of forms, as disclosed for example by German Patent Documents DE 22 55 788 and DE 34 23 299 A1. These however are nearly exclusively so-called light-barrier systems or devices based on TV systems and are therefore more or less permanently installed pointing in a "target direction."

A comprehensive and costly device is known from British Patent Document GB 2 183 878 A that utilizes image comparison, with a stored normal image serving as a basis to which all continuously taken additional images are compared, so that any change (for example as a result of persons penetrating the monitored area) is detected. The proposed measures not only entail very high equipment cost but high processing expense as well, so that they cannot be used for mobile applications.

An object of the invention is to provide a system of the type described above which eliminates the disadvantages of the prior art, i.e. is reduced to a minimum in terms of components and processing cost, but can also be used for mobile property.

This object is achieved according to preferred embodiments of the present invention by providing a system for protecting buildings, vehicles, and persons by means of a laser monitoring device consisting of a laser transmitter and receiver and an associated evaluation unit, comprising:

a platform with variably adjustable rotational speed provided on an elevated station with an unobstructed view above the property to be protected, an area-monitoring laser device mounted on the platform, and an external evaluation and control unit connected to communicate with the laser device and which determines, identifies, and displays changes on the basis of stored information.

Other objects, advantages and novel features of the present invention will become apparent from the following detailed description of the invention when considered in conjunction with the accompanying drawings.

DETAILED DESCRIPTION OF THE DRAWINGS

The idea of the invention is to provide a system to protect buildings, vehicles, and persons and which, with its concept nearly unchanged, can also be used in fixed and mobile applications, i.e. it can be installed on buildings as well as on vehicles. This means that the basic design of the device and its operation and function are the same in all cases, so that it lends itself to preliminary mass production that can be expanded by additional devices, etc. depending on the circumstances.

Figure 1:
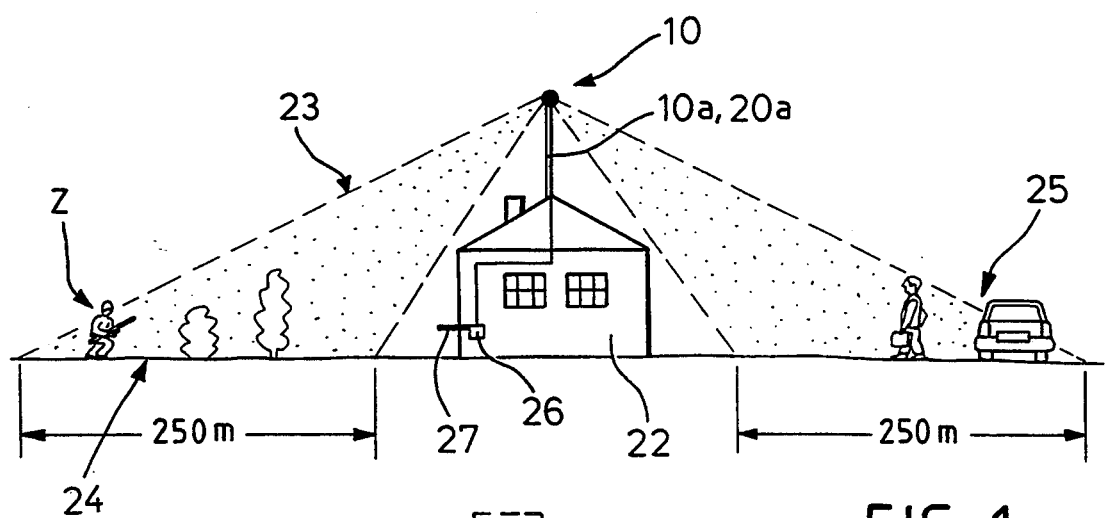
FIG. 1 is a schematic diagram of a system for property protection, constructed according to a preferred embodiment of the present invention.
Figure 2:
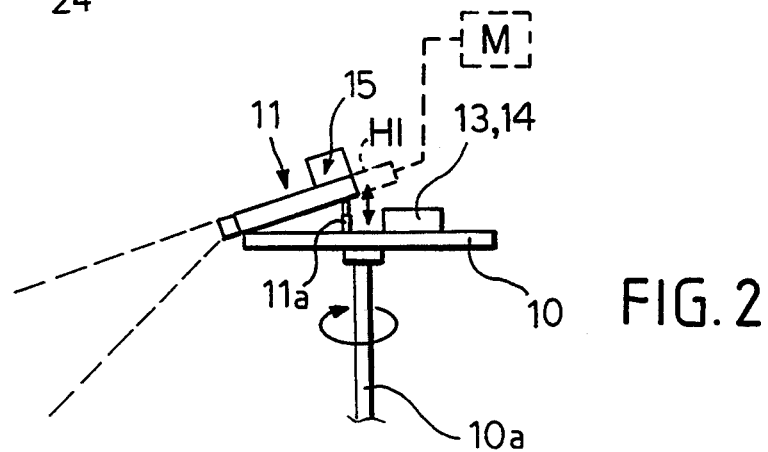
FIG. 2 is a schematic side view of an equipped gyro platform for use with the system of FIG. 1.

The above property protection system, from the standpoint of the control program of the computer alone, is simpler for stationary property than for mobile objects, as will be explained below. FIG. 1 shows the relatively simple case of protecting a building. In this case the property protection device sketched in FIG. 2 is mounted on a mast 20a. Mast 20a can be a guide tube for example, in which rotary rod 10a of platform 10 is held and mounted. The length of the rod depends on the design of object 22 and its environment, so that a sufficiently large unobstructed area all around can be monitored as shown in FIG. 1.

Figure 3:
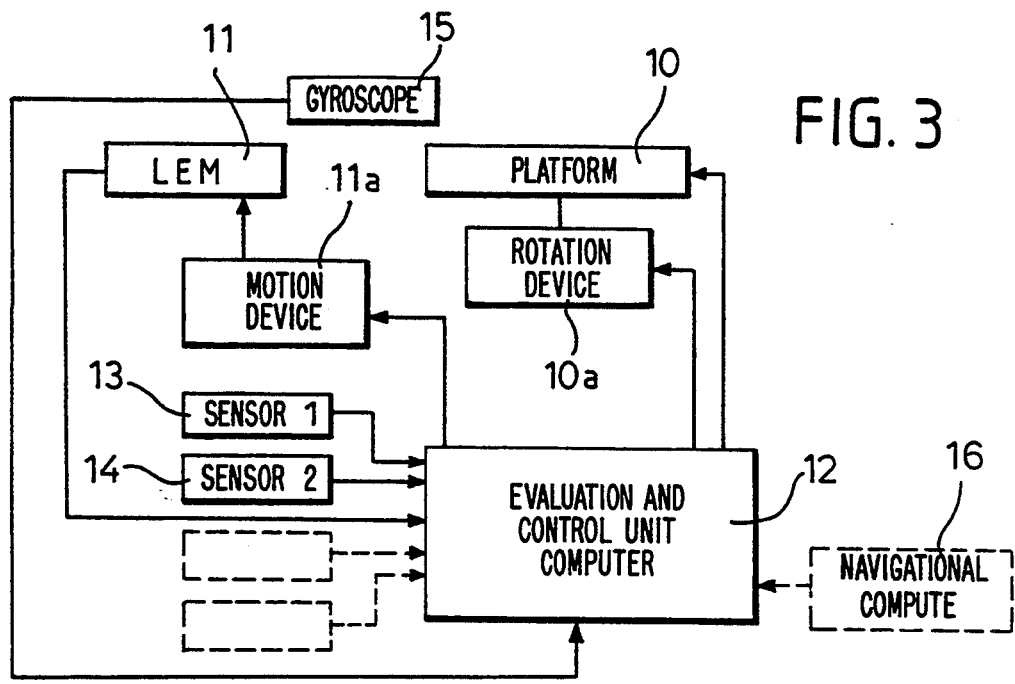
FIG. 3 is a simplified block diagram of an embodiment of the invention with additional sensors.

Platform 10, turned at a variable rotational speed by the control unit of evaluation and control unit 12 (FIG. 3), serves to accommodate monitoring of the surroundings. A laser device 11 is mounted on platform 10 in such fashion that it can assume various angular positions, for example by means of a length-adjustable device 11a, so that the areas swept by the laser can be varied in terms of its distance from property 22. In addition, the transmitting optics of laser 11 are designed so that laser beam 23 is variably expandable and hence illuminated area 24 is likewise adjustable.

In preferred embodiments the transmitting optics of the laser device is designed as zoom optics. Also, preferred embodiments provide that the laser power is adjustable in energy and intensity.

In addition, a position and rotation gyroscope 15 is integrated on rotatable platform 10 and/or laser device/sensors 11, 13, 14 in order to find the position reference and/or to allocate new data at known fixed points from incoming data and/or to find again the azimuth and elevation of a point or pattern stored or preset in the computer. Gyroscope 15 also serves to stabilize movement unit 11a.

Figure 4:
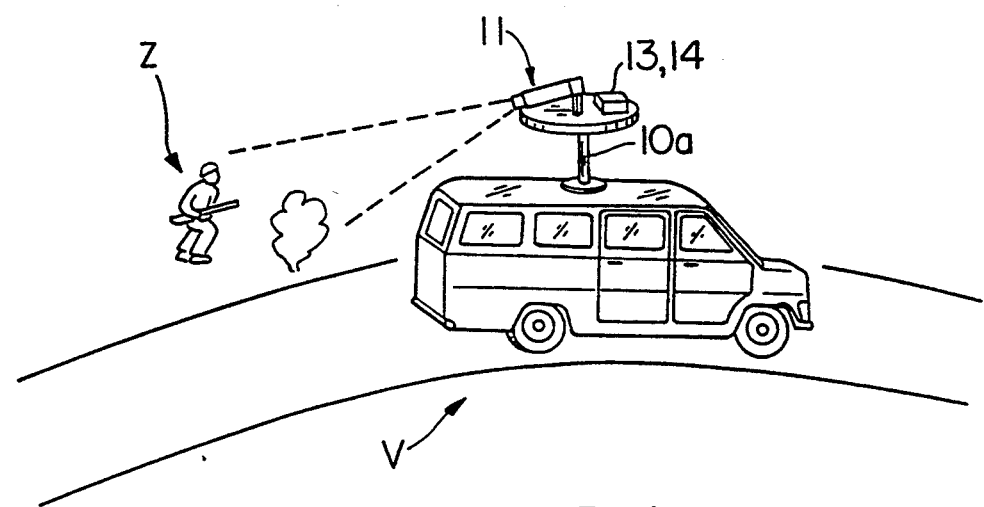
FIG. 4 is a schematic diagram of an embodiment of the invention with a mobile device mounted on a motor vehicle, e.g. an advance or escort vehicle in a vehicle column.

In the mobile version according to FIG. 4, the above gyroscope 15 can also be designed as an inertial platform with a directional gyroscope, gyro accelerometer, position sensor, or navigational gyroscope, including an accelerometer.

An evaluation and control unit 12, 26 that can consist of a microprocessor with memory unit is mounted away from platform 10. This evaluation and control unit can also include a navigational and computer 16. On the basis of data and programs stored in its memory, this unit controls rotation, angular positions, areas illuminated by the beam, etc. and compares the input information with the stored information. In addition, the microprocessor and gyro device 15 assume data management to assign known stored points or patterns of new data spatially and to ensure evaluation and/or later rapid return to preset (fixed) points. If irregularities develop in this regard, they are either signalled by an alarm or displayed visually. They include the following: body movements, unusual contours, for example, a bending human form with a projecting straight body (a person carrying a weapon in his/her hand) or a long staying time, unusual location Z, etc.

In an expanded embodiment it is proposed that laser device 11 is a laser rangefinder moved on platform 10 according to a computer-controlled search pattern. This laser has associated with it one or more sensors, for example metal and/or acoustic sensors, infrared sensors, directional microphones, etc. 13, 14, ..., that input their signals in parallel with the laser or laser rangefinder signals to evaluation and control unit 12 where they are suitably processed for target detection and identification. Upon identification, the signals thus obtained can be passed automatically from evaluation and control unit 12, 26 to various command centers, such as to the police, etc. via a communications means 27.

In another embodiment however, the identification signals can also be transmitted to defensive devices or anti-concealment devices to activate them. In this embodiment of course such devices as searchlights, gates, etc. can also be controlled and synchronized by computer 12, 26. One especially security-promoting measure in this case is for the laser, initially operating in a range that is safe for the eyes, when it could be termed a "search laser," to have its laser power automatically amplified and then to serve as a "blinding laser." Variable-power lasers have also been previously disclosed by the owner of this application, Messerschmitt-Bölkow-Blohm GmbH (now AG) and can easily be set to different "blinding times."

The proposed device also lends itself without great expense to mobile applications in vehicles, for example on a holding device, mounted on the vehicle roof of vehicle V, for platform support rod 10a (FIG. 4). A laser range finder with additional synchronously coupled detectors is especially recommended for this application. The advanced state of microelectronics today easily permits the manufacture of small devices 10 that do not take up a large amount of space, like the "blue lights" on police and fire vehicles, etc.

It is also proposed to connect area-monitoring laser device (11) with a heat imaging device HI (FIG. 2, dash lines) in an axially harmonized fashion and to display the images received on a monitor M. Many variations and combinations of the embodiments described above are possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. System for protecting buildings, vehicles, and persons, comprising:
   a platform with variably adjustable rotational speed provided on an elevated station with an unobstructed view about the property to be protected,
   an area-monitoring laser device mounted on the platform, and
   an evaluation and control unit located externally of the laser device and connected to communicate with the laser device and which determines, identifies, and displays laser device detected changes on the basis of stored information.

2. System according to claim 1, wherein the area monitoring laser device is a laser rangefinder moved on the rotating platform in accordance with a computer-controlled search pattern.

3. System according to claim 2, comprising further sensors inputting their signals in parallel with the laser signal to the evaluation and control unit to be processed there.

4. System according to claim 3, wherein the evaluation and control unit is a microprocessor with a memory unit, coupled to a navigational computer.

5. System according to claim 4, comprising position and turn gyroscopes integrated on the platform and controlled by the external evaluation and control unit.

6. System according to claim 1, comprising further sensors inputting their signals in parallel with the laser signal to the evaluation and control unit to be processed there.

7. System according to claim 6, wherein the further sensors include one of metal detectors, directional microphones, acoustic sensors and infrared sensors mounted on the platform in combination with the area-monitoring laser device.

8. System according to claim 1, wherein the evaluation and control unit is a microprocessor with a memory unit, coupled to a navigational computer.

9. System according to claim 1, comprising position and turn gyroscopes integrated on the platform and controlled by the external evaluation and control unit.

10. System according to claim 9, comprising further sensors inputting their signals in parallel with the laser signal to the evaluation and control unit to be processed there.

11. System according to claim 1, wherein the area-monitoring laser device is axially harmonized with a heat image device, whose received images are input into an external monitor.

12. System according to claim 11, comprising further sensors inputting their signals in parallel with the laser signals to the evaluation and control unit to be processed there.

13. System according to claim 12, wherein the transmitting optics of the laser device is designed as zoom optics.

14. System according to claim 13, wherein the laser power is adjustable in energy and intensity.

15. System according to claim 1, wherein the transmitting optics of the laser device is designed as zoom optics.

16. System according to claim 1, wherein the laser power is adjustable in energy and intensity.

* * * * *